United States Patent [19]

Suzuki et al.

[11] Patent Number: 4,926,498
[45] Date of Patent: May 15, 1990

[54] FM DIVERSITY RECEIVER

[75] Inventors: Hirohisa Suzuki; Masaya Tanno, both of Ora, Japan

[73] Assignee: Sanyo Electric Co., Ltd., Osaka, Japan

[21] Appl. No.: 244,675

[22] Filed: Sep. 14, 1988

[30] Foreign Application Priority Data

Sep. 17, 1987 [JP] Japan ............................ 62-232922

[51] Int. Cl.$^5$ ............................................. H04B 11/16
[52] U.S. Cl. ..................................... 455/133; 455/135; 455/277; 375/100
[58] Field of Search ....................... 455/133–136, 455/52, 277, 272, 275, 278, 295; 375/100; 381/13, 14, 106; 377/54, 64, 68

[56] References Cited

U.S. PATENT DOCUMENTS 3,916,316 10/1975 Hearn ............................ 455/134
4,143,321 3/1979 Norsworthy ................. 455/133
4,578,819 3/1986 Shimizu ........................ 455/135
4,756,023 7/1988 Kojima ......................... 455/133

Primary Examiner—Reinhard J. Eisenzopf
Assistant Examiner—Curtis A. Kuntz
Attorney, Agent, or Firm—Darby & Darby

[57] ABSTRACT

An FM receiver includes a first antenna and a second antenna. A first pulse generator produces a first pulse according to a noise signal included in the signal received by the first antennas, and a second pulse generator produces a second pulse according to a noise signal included in the signal received by the second antennas. A calculation circuit including shift registers is provided for shifting data, which is either one of the first and second pulses, in one direction in accordance with the first pulse from the first pulse generator and for shifting the switch data in another direction in accordance with the second pulse from the second pulse generator. Also, a switch circuit is provided for switching on a transmission line for a signal received at either one of the first and second antenna in response to the data produced from the calculation circuit.

6 Claims, 2 Drawing Sheets

FM DIVERSITY RECEIVER

BACKGROUND OF THE INVENTION

1. Field of the Invention

The present invention relates to an FM radio receiver, and particularly to a diversity FM radio receiver which receives using two antennas positioned separated by a distance.

2. Description of Related Art

Diversity FM radio receivers which have two separately provided antennas, such as one located at the front and the other located at the back of an automobile, and select and use one of the aforementioned antennas according to the condition of the reception are known from the prior art. The aforementioned diversity FM radio receiver, such as disclosed in JAS JOURNAL from page 3 to 9 issued in the November 1981, is able to reduce multipath-noise signal and skip-noise signal which are produced locally and have an adverse effect on FM signal received by one antenna, but no effect on FM signal received by the other antenna. However, the aforementioned diversity type FM radio receiver also responds to ignition-noise signal which is produced such as during the engine running period. Since the ignition-noise signal adversely effects simultaneously on FM signals received by the two antennas, the switching operation to change the use of antenna from one in the front to the other in the back, or vice versa, will not result in the reduction or deletion of the noise signal. In other words, with respect to the ignition-noise signal, the switching of the antenna merely results in unnecessary switching operation from a poor reception condition to a poor reception condition.

An FM receiver which can distinguish multipath-noise signal and skip-noise signal from ignition-noise signal is disclosed, for example, in Japanese Patent Laid-Open Publication No. 189820/1987 assigned to the same assignee as the present application. According to this FM receiver, counters are employed to count the number of occurrence of the noise signal from the two antennas individually, and then select the antenna with less noise signal reception condition. In this case, since the number of occurrence of the ignition-noise signal is the same in both antennas, it is possible to distinguish the aforementioned ignition-noise signal.

However, the problem is that the construction of the noise discriminator using a counter is complex, thus necessitating a larger chip surface area when designed into an integrated circuit.

SUMMARY OF THE INVENTION

The present invention has been developed with a view to substantially solving the above described problem and has for its essential object to provide an improved FM receiver which can discriminate ignition-noise signal from other noise signals without using any counter.

In accomplishing these and other objects, an FM receiver according to the present invention comprises first antenna means, second antenna means, first pulse generator for producing a first pulse according to a noise signal included in the signal received by the first antennas means, second pulse generator for producing a second pulse according to a noise signal included in the signal received by the second antennas means, a calculation circuit including shift registers for shifting a switch data, which is either one of the first and second pulses whichever enters said shift register first, in one direction in accordance with the first pulse from said first pulse generator and for shifting the switch data in another direction in accordance with the second pulse from said second pulse generator, and a switch circuit for switching on a transmission line for a signal received at either one of said first and second antenna means in response to the switch data produced from calculation circuit.

By the FM receiver according to the present invention, reception interference caused by the skip-noise signal or multipath-noise signal can be suppressed by selecting, from the signals received at the two antennas, the one with less noise. Furthermore, because noise discrimination using a shift register which can shift in both directions, it is not necessary to use a counter, and an FM receiver with a circuit construction suited to integration can be obtained.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENT

Figure 1:
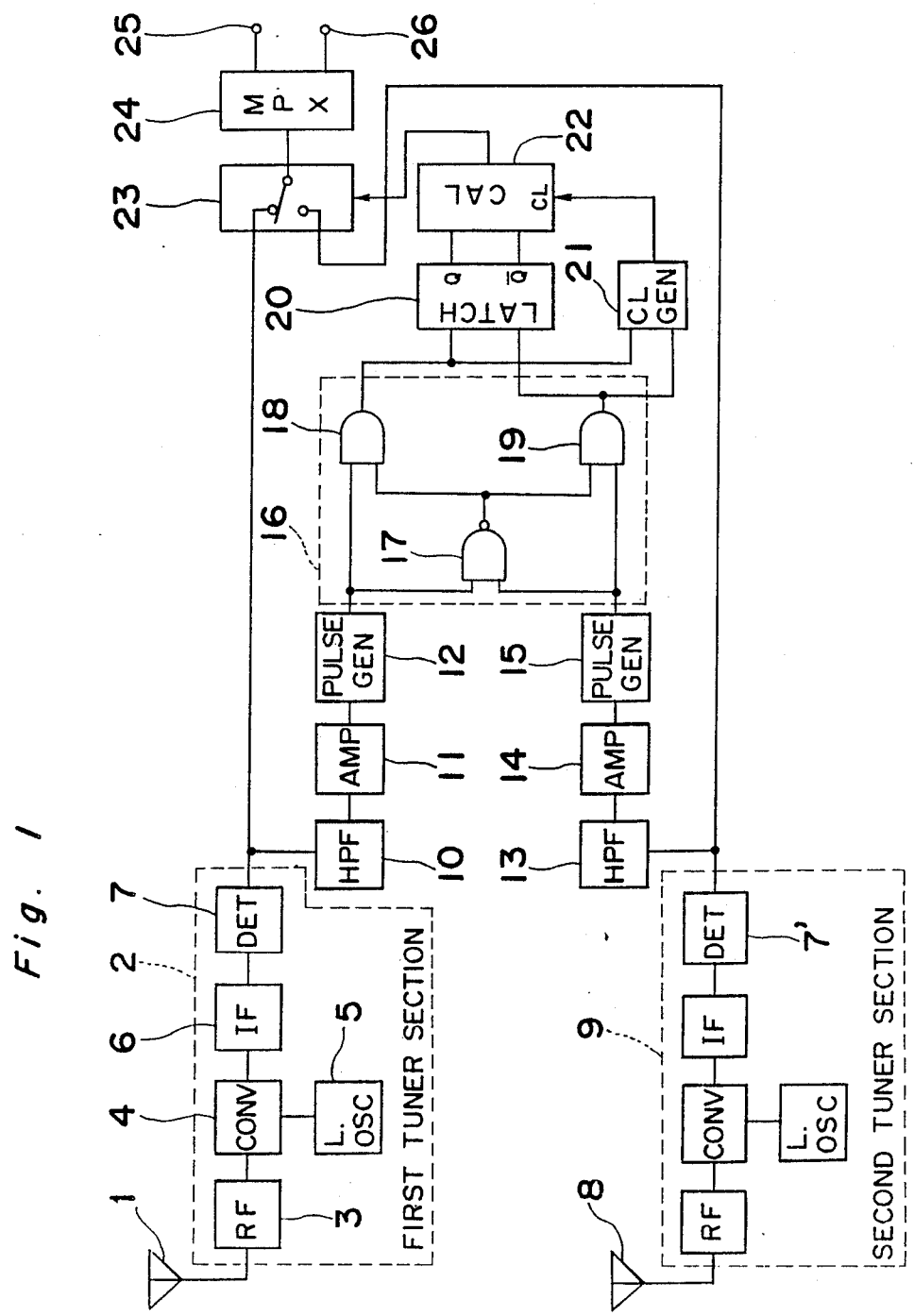
FIG. 1 is a circuit diagram showing a preferred embodiment of the present invention.

Referring to FIG. 1, a preferred embodiment of the present invention is shown. Reference number 1 is a first antenna positioned, for example, in the front part of an automobile (not shown). Reference number 2 is a first tuner section which includes: RF (radio frequency) amplifier 3; convertor 4; local oscillator 5; IF (intermediate frequency) amplifier 6; and wave detector 7. First tuner section 2 receives an FM signal from antenna 1 and produces an FM detected signal. Reference number 8 is a second antenna positioned, for example, at the back of the automobile; and 9 is a second tuner section having the same construction as the first tuner section 2 and which receives an FM signal from antenna 8 and produces an FM detected signal. Reference number 10 is a first high pass filter which passes high band noise signal included in the FM detected signal; 11 is a first amplifier which amplifies the output signal of the first high pass filter 10; 12 is a first pulse generator which generates a pulse in response to the noise signal included in the output signal of the first amplifier 11 and greater than a predetermined level; 13 is a second high pass filter; 14 is a second amplifier; and 15 is a second pulse generator. A reference number 16 is a logic circuit which consists of NAND gate 17 which receives the output signals from the first and second pulse generators 12 and 15, AND gate 18 which receives the output signals from the first pulse generator 12 and NAND gate 17, and AND gate 19 which receives the output signals from the second pulse generator 15 and NAND gate 17. When both pulse generators 12 and 15 produce a pulse at the same time, as occurred when antennas 1 and 8 are receiving ignition-noise signal, NAND gate 17 produces a HIGH level signal to disable AND gates 18 and 19, thereby cutting the pulse from the pulse generators 12 and 15.

Reference number 20 is a latch circuit 20 which latches the output signals from the first and second AND gates 18 and 19; 21 is a clock generator which generates a clock signal in response to the output signals of the first and second AND gates 18 and 19; 22 is a calculator which shifts the output signal from the latch circuit 20 and generates a switch signal when the specified shift has occurred; 23 is a switch circuit controlled by the output signal from calculator 22 to switch the output signal thereof between the output signals from wave detectors 7 and 7' of the first and second tuner sections 2 and 9, respectively; and 24 is a stereo multiplexer which separates the output signal from the switch circuit 23 into right and left stereo signals.

If switch circuit 23 is switched to the position shown in FIG. 1, the signal received at first antenna 1 and processed in the first tuner section 2 passes through switch circuit 23, and in turn, is applied to stereo multiplexer 24. Thus, left and right stereo signals are outputted to first and second output terminals 25 and 26. At this time, the signal received at second antenna 8 and processed in the second tuner section 9 is not used.

The high band noise signals in the FM detected signals obtained at the output terminals of wave detectors 7 and 7' of first and second tuner sections 2 and 9, respectively, pass first and second high pass filters 10 and 13, and is amplified by first and second amplifiers 11 and 14. Next, an output pulse is produced from first pulse generator 12 when the output signal from first amplifier 11 is greater than a predetermined level. Similarly an output pulse is produced from second pulse generator 15 when the output signal from second amplifier 14 is greater than a predetermined level.

The output pulses from first and second pulse generators 12 and 15 are applied through first and second AND gates 18 and 19 to latch circuit 20, in a condition that no output pulse is produced simultaneously from the first and second pulse generators 12 and 15. If the output pulses are simultaneously produced from first and second pulse generators 12 and 15, NAND gate 17 produces a LOW level signal to disable AND gates 18 and 19, so that the output pulses are cut off and will not be sent to latch circuit 20.

Latch circuit 20 produces a HIGH level signal from terminal Q in response to the pulse produced from AND gate 18, and produces a HIGH level signal from terminal $\overline{Q}$ in response to the pulse produced from second AND gate 19. Furthermore, clock generator 21 generates a clock signal equivalent to the sum of the output pulses from first and second AND gates 18 and 19. In other words, clock generator 21 generates a clock signal in response to a pulse produced from either one of AND gates 18 and 19.

Figure 2:
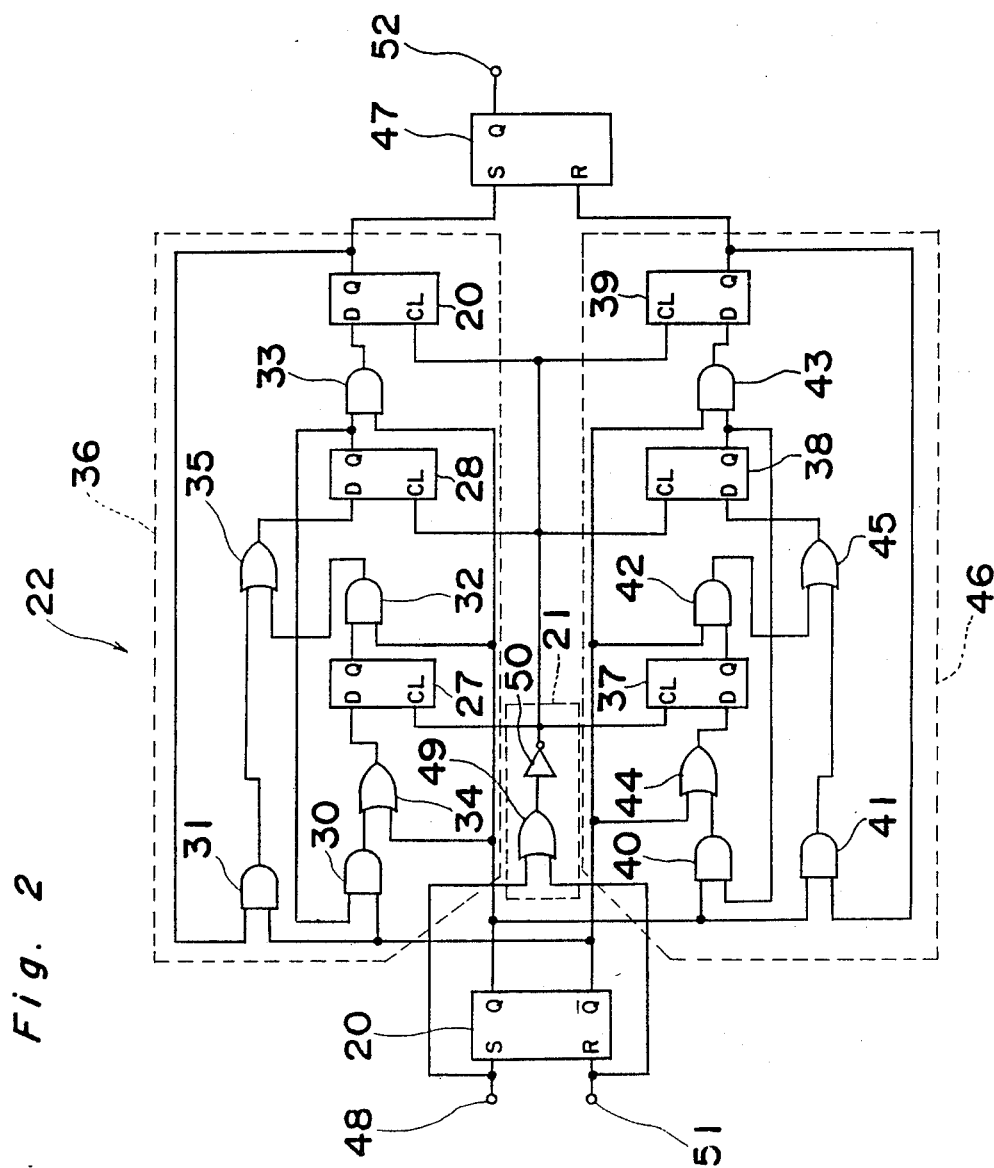
FIG. 2 is a circuit diagram showing a preferred embodiment of a calculator shown in FIG. 1.

Referring to FIG. 2, calculator 22 is formed by first shift register 36, second shift register 46 and RS-FF (reset set flip-flop) 47. The first shift register 36 consisting of three D-FFs (delayed flip-flops) 27, 28 and 29, four AND gate 30, 31, 32 and 33, and two OR gates 34 and 35. In the first shift register 36, the data stored in D-FF 27, 28 and 29 shifts right or left, when viewed in FIG. 2, in accordance with the HIGH level signal from Q or $\overline{Q}$ terminal, respectively, of latch circuit 20.

The second shift register 46 consists of three D-FFs 37, 38 and 39, four AND gates 40, 41, 42 and 43, and two OR gates 44 and 45. In the second shift register 46, the data stored in D-FF 37, 38 and 39 shifts right or left, when viewed in FIG. 2, in accordance with the HIGH level signal from $\overline{Q}$ or Q terminal, respectively, of latch circuit 20. The RS-FF 47 is set by the HIGH level signal from the first shift register 36 and reset by the HIGH level signal from the second shift register 46.

The operation of calculator 22 is herein explained with reference to FIG. 2. Initially, it is assumed that D-FFs 27, 28, 29, 37, 38 and 39 are carrying no data so that D-FFs 27, 28 and 29 produces data [0,0,0] and D-FFs 37, 38 and 39 produces data [0,0,0]. When a HIGH level pulse is applied to first input terminal 48 of latch circuit 20, the Q and $\overline{Q}$ outputs of latch circuit 20 produce HIGH and LOW level signals respectively. Thus, AND gates 30 and 31 are disabled, and OR gate 34 produces a HIGH level signal which is applied to the D input of D-FF 27. Then, the Q output of D-FF 27 produces a HIGH level signal in response to the clock signal from the clock generator 21 composed of OR gate 49 and inverter 50. Accordingly, the data stored in first shift register 36 is shifted right from [0,0,0] to [1,0,0]. When three input pulses are successively applied to first input terminal 48 of latch circuit 20, the data stored in first shift register 36 further changes successively to [1,1,0] and then to [1,1,1]. Thus, a HIGH level signal is generated from the Q terminal of the third D-FF 29.

Furthermore, if in the meantime a HIGH level pulse is applied to the second input terminal 51 of latch circuit 20, the data stored in the first shift register 36 shifts left from [1,1,0] to [1,0,0] and further to [0,0,0].

Because the input relationship of second shift register 46 is opposite to that of first shift register 36, its operation is the direct opposite to that of first shift register 36. Specifically, from the initial state, when three input pulses are successively applied to second input terminal 51 of latch circuit 20, the second shift register 46 stores data [1,1,1], so that the Q output of D-FF 39 produces a HIGH level signal.

It is understood that the shift register 36 shifts a switch data which is a HIGH level signal from either one of Q or $\overline{Q}$ terminal of RS-FF 20. The switch data is shifted in one direction in accordance with the HIGH level signal from Q terminal of RS-FF 20, and it is shifted in another direction in accordance with the the HIGH level signal from $\overline{Q}$ terminal of RS-FF 20.

RS-FF 47 is set by a HIGH level signal from the Q terminal of first shift register 36, resulting in generation of a HIGH level signal from the Q terminal 52. Furthermore, RS-FF 47 is reset by a HIGH level signal from the Q terminal of second shift register 46, resulting in generation of a LOW level signal from the Q terminal 52. When the Q terminal 52 produces a HIGH level signal, switch circuit 23 is switched to the position opposite to that shown in FIG. 1, and when it produces a LOW level signal, switch circuit 23 is held in the position as shown in FIG. 1.

As apparent from the above, first shift register 36 serves as a storing means defined by an array of register cells 27, 28 and 29 connected in series. The first shift register 36 stores the HIGH level signal, from Q terminal of RS-FF 20, from entrance end of the array of cells and shifts the HIGH level signal towards the exit end of the array of cells in response to subsequently produced HIGH level signals, and for shifting the HIGH level signal towards entrance end of the array of cells in response to subsequently produced HIGH level signals which is from $\overline{Q}$ terminal of RS-FF 20. When the HIGH level signal is shifted out from the exit end of the array of register cells 27, 28 and 29 RS-FF 47 generates a switch signal which is applied to switching circuit 23.

Referring back to FIG. 1, when switch circuit 23 is in the position as shown, and when the signal received by the first antenna 1 contains multipath-noise signal, a HIGH pulse is generated from first pulse generator 12 and, thus, the Q output of latch circuit 20 produces a HIGH level signal. When the first pulse generator 12 produces three HIGH pulses consecutively, a HIGH level signal is generated from calculator 22 in a manner described above in connection with FIG. 2, thereby switching the switch circuit 23 to the position opposite to that shown in FIG. 1. Thus, the signal received by the second antenna 8 and processed by second tuner section 9 passes through switch circuit 23 and is applied to stere multiplexer 24 thereby avoiding the reception of multipath-noise signal.

If multipath-noise signal is contained in the signal received by the second antenna 8, a HIGH pulse is produced from second pulse generator 15, so that the $\overline{Q}$ terminal of latch circuit 20 produces a HIGH level signal. When the second pulse generator 15 produces three HIGH pulses continually, calculator 22 produces a LOW level signal so that switch circuit 23 once again assumes the position shown in FIG. 1. Thus, good signal receiving by the first antenna 1 takes place.

As discussed heretofore, because the FM radio receiver shown in FIG. 1 constantly monitors the generation of noise and is able to automatically select the antenna with a better reception condition, FM radio receiver picks up less noise.

As described heretofore, a diversity FM radio receiver according to the present invention automatically selects a good reception condition. In particular, because a shift register is employed which can shifts the data right or left during the noise detection, the construction can be simplified and an FM radio receiver according to the present invention can be easily formed in an integrated circuit. Moreover, since a logic circuit 16 is provided at a stage after the pulse generator, multipath-noise signal and skip-noise signal can be discriminated from ignition-noise signal, so that unnecessary antenna switching operation can be prevented.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An FM receiver comprising:
    first antenna means;
    second antenna means;
    first pulse generator for producing a first pulse according to a noise signal included in the signal received by the first antennas means;
    second pulse generator for producing a second pulse according to a noise signal included in the signal received by the second antennas means;
    a calculation circuit including shift register means for shifting data in one direction in accordance with the first pulse from said first pulse generator and for shifting the data in another direction in accordance with the second pulse from said second pulse generator; and
    a switch circuit for switching on a transmission line for a signal received at either one of said first and second antenna means in response to a predetermined number of said first or said second pulses shifting the data of the calculation circuit.

2. An FM receiver as claimed in claim 1, wherein said data is either one of said first and second pulses.

3. An FM receiver as in claim 2, wherein there are first and second shift registers each having an input for receiving the pulses and an output, each said shift register respectively responsive to said first and second pulses for shifting the data in opposite directions, said switching circuit switching on a transmission line when the data has been shifted to the output of one of said shift registers.

4. An FM receiver comprising:
    first antenna means for receiving FM signal and for producing a first FM detected signal;
    second antenna means for receiving FM signal and for producing a second FM detected signal;
    first noise signal detecting means for detecting a noise signal contained in said first FM detected signal and for producing a first pulse in response to the detection of the noise signal;
    second noise signal detecting means for detecting a noise signal contained in said second FM detected signal and for producing a second pulse in response to the detection of the noise signal;
    first storing means defined by a first array of cells for storing said first pulse from one end of said first array of cells and for shifting said first pulse towards other end of said first array of cells in response to subsequently produced first pulses, and for shifting said first pulse towards said one end of said first array of cells in response to subsequently produced second pulses;
    first generating means for generating a first switch signal when said first pulse is shifted out from said other end of said first array of cells;
    second storing means defined by a second array of cells for storing said second pulse from one end of said second array of cells and for shifting said second pulse towards other end of said second array of cells in response to subsequently produced second pulses, and for shifting said second pulse towards said one end of said second array of cells in response to subsequently produced first pulses;
    second generating means for generating a second switch signal when said second pulse is shifted out from said other end of said second array of cells;
    selecting means for selecting said first FM detected signal when said second switch signal is generated, and for selecting said second FM detected signal when said first switch signal is generated.

5. An FM receiver as claimed in claim 4, further comprising a logic circuit connected to outputs of said first and second noise signal detecting means for disabling the transmission of said first and second pulses to said first and second storing means when said first and second pulses are produced simultaneously.

6. An FM receiver as claimed in claim 4, wherein each of said first and second array of cells comprises serially connected shift registers.

* * * * *